United States Patent
Xie et al.

(10) Patent No.: US 12,304,800 B2
(45) Date of Patent: May 20, 2025

(54) WATER DISPENSING APPARATUS, CONTROL METHOD OF WATER DISPENSING APPARATUS

(71) Applicants: FOSHAN SHUNDE MIDEA WATER DISPENSER MANUFACTURING CO., LTD., Foshan (CN); MIDEA GROUP CO., LTD., Foshan (CN)

(72) Inventors: Yifan Xie, Foshan (CN); Zhile Xu, Foshan (CN); Zhaolin Du, Foshan (CN); Binjie Xu, Foshan (CN)

(73) Assignees: FOSHAN SHUNDE MIDEA WATER DISPENSER MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 337 days.

(21) Appl. No.: 17/954,297

(22) Filed: Sep. 27, 2022

(65) Prior Publication Data
US 2023/0019143 A1    Jan. 19, 2023

Related U.S. Application Data

(63) Continuation of application No. PCT/CN2021/106425, filed on Jul. 15, 2021.

(30) Foreign Application Priority Data

Aug. 6, 2020 (CN) .......................... 202010784488.7
Aug. 6, 2020 (CN) .......................... 202021622376.3

(51) Int. Cl.
*B67D 1/00* (2006.01)
*B67D 1/08* (2006.01)
(Continued)

(52) U.S. Cl.
CPC ......... *B67D 1/0888* (2013.01); *B67D 1/0014* (2013.01); *B67D 1/1202* (2013.01); *G01V 8/12* (2013.01); *A47J 31/52* (2013.01)

(58) Field of Classification Search
CPC .. B67D 1/0888; B67D 1/0014; B67D 1/1202; G01V 8/12; A47J 31/52
See application file for complete search history.

(56) References Cited

U.S. PATENT DOCUMENTS

| 4,051,365 A | 9/1977 | Fukuyama et al. |
| 8,421,020 B2 * | 4/2013 | Chen ........................ E03C 1/057 250/353 |

(Continued)

FOREIGN PATENT DOCUMENTS

| CN | 1428485 A | 7/2003 |
| CN | 101220883 A | 7/2008 |

(Continued)

OTHER PUBLICATIONS

Extended European Search Report received in EP Application No. 21852538.4; mailed Aug. 16, 2023.
(Continued)

*Primary Examiner* — Frederick C Nicolas

(57) ABSTRACT

Provided are a water dispensing apparatus and a control method of the water dispensing apparatus. The water dispensing apparatus includes a main body, and an infrared sensing device. The infrared sensing device includes a mounting support, an electric control board having an infrared transmitting device and an infrared receiving device. The infrared receiving device is configured to receive an infrared ray transmitted by the infrared transmitting device. The mounting support has a first through hole at a position
(Continued)

corresponding to the infrared transmitting device, and a second through hole at a position corresponding to the infrared receiving device.

18 Claims, 7 Drawing Sheets

(51) Int. Cl.
*B67D 1/12* (2006.01)
*G01V 8/12* (2006.01)
*A47J 31/52* (2006.01)

(56) References Cited

U.S. PATENT DOCUMENTS

| | | | |
|---|---|---|---|
| 9,194,110 B2* | 11/2015 | Frick | E03C 1/055 |
| 9,999,323 B2* | 6/2018 | Farahat | G07F 17/18 |
| 10,053,354 B2* | 8/2018 | Rosenlund | B67D 1/0882 |
| 10,612,221 B2* | 4/2020 | Yan | A47L 15/449 |
| 2011/0266559 A1 | 11/2011 | Zitzlsperger et al. | |
| 2016/0368754 A1 | 12/2016 | Rosenlund et al. | |
| 2018/0028025 A1 | 2/2018 | Farahat et al. | |
| 2019/0328204 A1 | 10/2019 | Yan | |
| 2020/0133318 A1 | 4/2020 | Lee | |

FOREIGN PATENT DOCUMENTS

| | | |
|---|---|---|
| CN | 101655301 A | 2/2010 |
| CN | 201396504 Y | 2/2010 |
| CN | 203322444 U | 12/2013 |
| CN | 104490279 A | 4/2015 |
| CN | 206023736 U | 3/2017 |
| CN | 107456086 A | 12/2017 |
| CN | 107989120 A | 5/2018 |
| CN | 208001836 U | 10/2018 |
| CN | 109724263 A | 5/2019 |
| CN | 208851245 U | 5/2019 |
| CN | 111317365 A | 6/2020 |
| JP | 2010112891 A | 5/2010 |
| JP | 2012018110 A | 1/2012 |
| TW | I227789 B | 2/2005 |

OTHER PUBLICATIONS

International Search Report mailed Sep. 28, 2021 for International Application No. PCT/CN2021/106425.
First OA with search report mailed Jun. 2, 2022 for CN Application No. 202010784488.7.
Rejection Decision malled Nov. 18, 2022 for CN Application No. 202010784488.7.

* cited by examiner

WATER DISPENSING APPARATUS, CONTROL METHOD OF WATER DISPENSING APPARATUS

CROSS-REFERENCES TO RELATED APPLICATIONS

This application is a continuation application of International Application No. PCT/CN2021/106425, filed on Jul. 15, 2021, which claims priority to Chinese Patent Application No. 202010784488.7 and No. 202021622376.3, filed on Aug. 6, 2020, the entireties of which are herein incorporated by reference.

FIELD

The present disclosure relates to the field of water dispensing apparatus technologies, and in particular, to a water dispensing apparatus and a control method of the water dispensing apparatus.

BACKGROUND

Water dispensing switches of water dispensing apparatuses in the related art are all touch switches, push-button switches or lever-type switches. The above various switches generally require direct contact by users, which is likely to cause a spread of contact viruses and bacteria. In addition, an operation is inconvenient and user experience is poor.

SUMMARY

The present disclosure aims to solve at least one of the problems existing in the related art. Therefore, an object of the present disclosure is to provide a water dispensing apparatus, which can control opening or closing of a control valve by an infrared sensing device, to realizing water dispensing control, convenient control and better user experience.

The present disclosure also provides a control method of a water dispensing apparatus.

The water dispensing apparatus of one embodiment of the present disclosure includes a main body, and an infrared sensing device. The infrared sensing device includes a mounting support arranged on an inner side of the main body, and an electric control board arranged on the mounting support and having an infrared transmitting device and an infrared receiving device. The infrared receiving device is configured to receive an infrared ray transmitted by the infrared transmitting device. The mounting support has a first through hole at a position corresponding to the infrared transmitting device, and a second through hole at a position corresponding to the infrared receiving device.

In the water dispensing apparatus, by mounting the infrared sensing device on the main body, a user can use simple gestures to control the water dispensing of the water dispensing apparatus, which can provide convenient control and avoid a cross infection caused by the user's direct contact with the water dispensing apparatus, to ensuring the user's water safety and improving user experience.

In the water dispensing apparatus, the infrared transmitting device and the infrared receiving device are spaced apart from each other and disposed on a same side of the electric control board. One of the mounting support and the electric control board has a partition portion located between the infrared transmitting device and the infrared receiving device.

In the water dispensing apparatus, the partition portion includes a first partition ring located on a side of the mounting support facing towards the electric control board and in communication with the first through hole, and the infrared transmitting device is disposed in the first partition ring.

In the water dispensing apparatus, the partition portion includes a second partition ring located on a side of the mounting support facing towards the electric control board and in communication with the second through hole, and the infrared receiving device is disposed in the second partition ring.

In the water dispensing apparatus, a light-shielding member is disposed between the main body and the mounting support. The light-shielding member has a first avoidance hole at a position corresponding to the first through hole, and a second avoidance hole at a position corresponding to the second through hole.

In the water dispensing apparatus, the mounting support has a mounting recess defined on a side thereof facing towards the main body. The first through hole and the second through hole are formed on a bottom wall of the mounting recess, and the light-shielding member is disposed in the mounting recess.

In the water dispensing apparatus, the light-shielding member is a light-shielding cotton having a thickness greater than a depth of the mounting recess.

In the water dispensing apparatus, the mounting support and the electric control board are connected to each other through buckling and/or by a fastener.

In the water dispensing apparatus, the mounting support has a support portion provided on a side thereof facing towards the electric control board. The electric control board is supported by the support portion. The mounting support has at least two buckling portions opposite to each other. The at least two buckling portions are buckled on and engaged with two opposite edges of the electric control board.

In the water dispensing apparatus, at least two support portions are provided and connected to the electric control board by a fastener, respectively.

In the water dispensing apparatus, at least one support portion has a limiting rib located on a side of the electric control board.

In the water dispensing apparatus, the electric control board is formed as a rectangular plate. The limiting rib includes a first rib section and a second rib section that are connected to each other. The first rib section is located on one side edge of the electric control board, and the second rib section is located on another side edge of the electric control board.

In the water dispensing apparatus, the main body includes a light-transmitting panel, and the infrared sensing device is disposed on an inner side of the light-transmitting panel.

The water dispensing apparatus of some embodiments of the present disclosure includes: a main body including an outlet portion and a control valve configured to control a water dispensing through the outlet portion; and an infrared sensing device to transmit signal with the control valve. The control valve to receive a water dispensing control signal from the infrared sensing device to control an opening or closing of the control valve. The infrared sensing device has sensing regions located at a surrounding of the main body and adjacent to the main body.

In the water dispensing apparatus of the present disclosure, by mounting the infrared sensing device on the main body, the user does not need to directly contact the water dispensing apparatus, and can control the opening or closing of the control valve through simple gestures to control the water dispensing, which can provide convenient control and avoid the cross infection caused by the user's direct contact with the water dispensing apparatus, to ensuring the user's water safety and improving user experience.

In the water dispensing apparatus, one or more infrared sensing devices are provided.

In the water dispensing apparatus, the infrared sensing devices is located on a front part of the main body, and at least one of the sensing regions is located in front of the main body.

In the water dispensing apparatus, a predetermined distance from the sensing regions to the main body is between 1 cm and 15 cm.

In the water dispensing apparatus, the predetermined distance is between 1 cm and 10 cm.

In the water dispensing apparatus, the infrared sensing device includes: an infrared modulating device configured to modulate a predetermined frequency to obtain an infrared modulated signal; an infrared transmitting device configured to transmit the infrared modulated signal to detect a person approaching the main body; an infrared receiving device configured to receive the infrared modulated signal reflected back by the person; and an infrared demodulating device configured to demodulate the received infrared modulated signal based on the predetermined frequency.

A control method of a water dispensing apparatus according to some embodiments of the present disclosure, the control method including: controlling the infrared sensing device to collect the water dispensing control signal; and controlling the control valve to be opened and closed based on the collected water dispensing control signal.

In the control method of the water dispensing apparatus of the present disclosure, the user does not need to directly contact the water dispensing apparatus, and controls the opening or closing of the control valve through simple gestures to control the water dispensing, which is convenient to control, avoids the cross infection caused by the user's direct contact with the water dispensing apparatus, ensures the user's water safety and improves user experience.

In the control method of the water dispensing apparatus, in response to the water dispensing control signal being collected one or more times within a first predetermined period of time, the control valve is opened to allow the water dispensing through the outlet portion.

In the control method of the water dispensing apparatus, in response to a duration of the collected water dispensing control signal exceeding a second predetermined period of time, the control valve is opened to allow the water dispensing through the outlet portion.

In the control method of the water dispensing apparatus, in response to a disappearance of the collected water dispensing control signal, the control valve is closed.

In the control method of the water dispensing apparatus, in response to a duration of the collected water dispensing control signal exceeding a third predetermined period of time, the control valve is closed.

In the control method of the water dispensing apparatus, the water dispensing control signal is a body movement of a person.

Additional embodiments of the present disclosure will be set forth, in part, from the following description, and in part will become apparent from the following description, or may be learned by practice of the present disclosure.

BRIEF DESCRIPTION OF THE DRAWINGS

The above and/or additional embodiments of the present disclosure will become apparent and readily understood from the following description of embodiments in conjunction with the accompanying drawings, in which.

Figure 1:
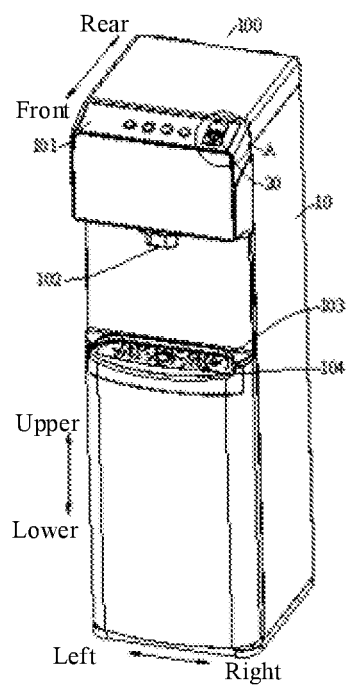
FIG. 1 is a schematic structural view of a water dispensing apparatus according to an embodiment of the present disclosure.

REFERENCE NUMERALS water dispensing apparatus 100,
main body 10, light-transmitting panel 101, outlet portion 102, tray 103, collecting tray 104,
infrared sensing device 20,
mounting support 21, first through hole 211, second through hole 212, partition portion 213, first partition ring 2131, second partition ring 2132, mounting recess 214, support portion 215, limiting rib 216, first rib section 2161, second rib section 2162, buckling portion 217,
electric control board 22, fixing hole 221,
infrared transmitting device 23, infrared receiving device 24,
light-shielding member 25, first avoidance hole 251, second avoidance hole 252.
infrared modulating device 26, infrared demodulating device 27.

DETAILED DESCRIPTION OF THE DISCLOSURE

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A water dispensing apparatus 100 according to some embodiments of the present disclosure will be described below with reference to FIGS. 1 to 6. The water dispensing apparatus 100 herein may be a water purifier, a water dispenser, or a drinking purifier.

Figure 2:
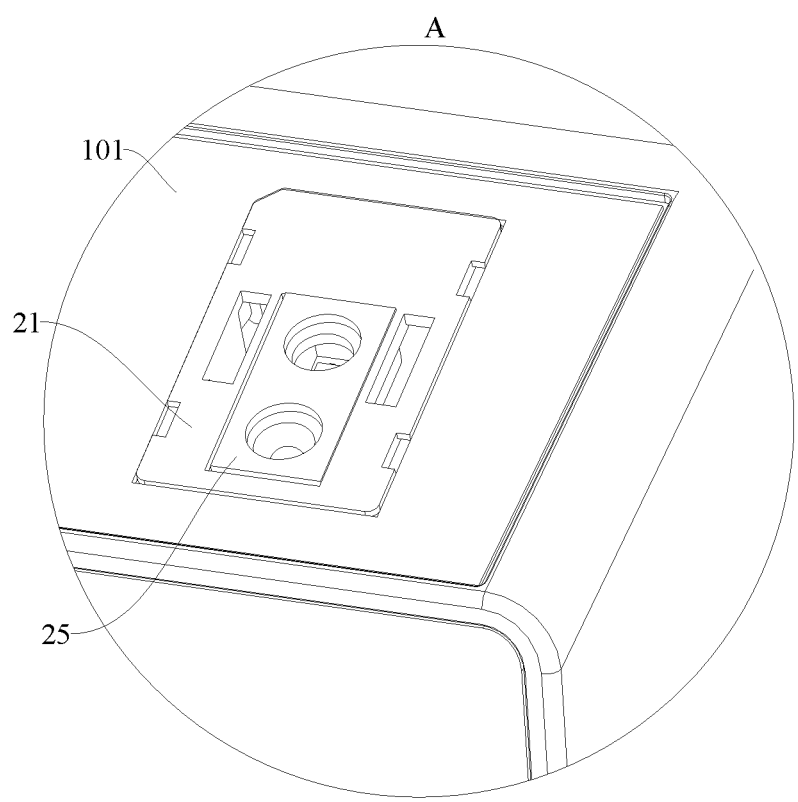
FIG. 2 is an enlarged view of part A shown in FIG. 1.
Figure 3:
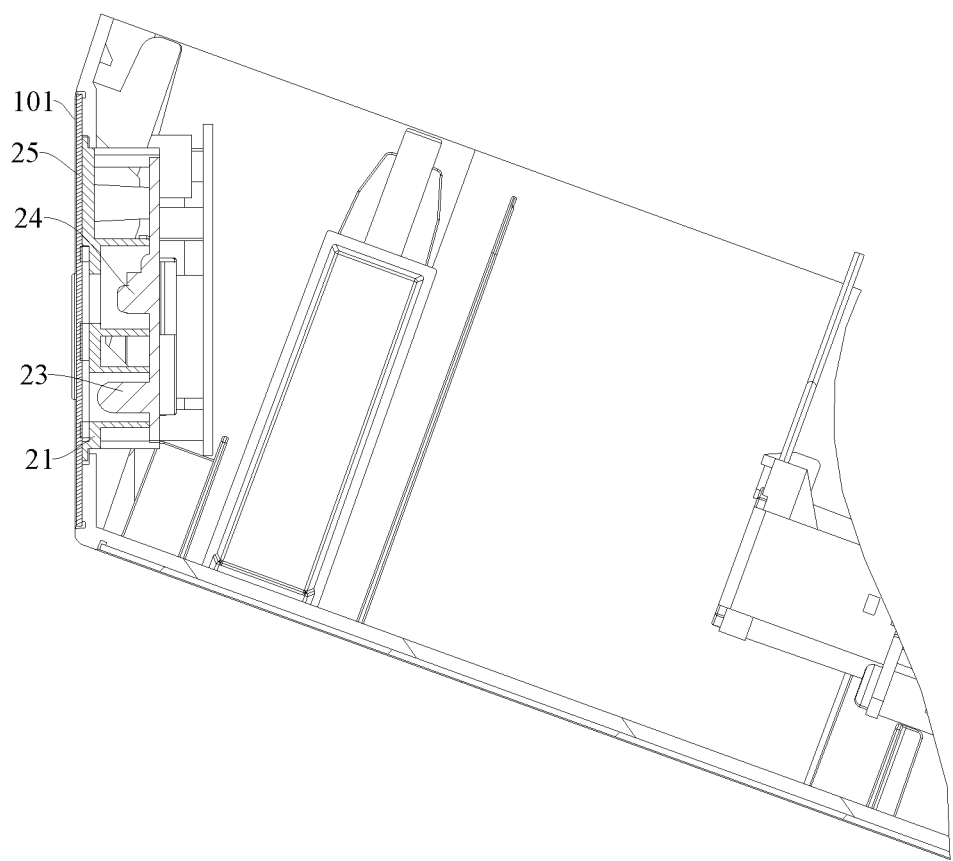
FIG. 3 is a partial structural cross-sectional view of a water dispensing apparatus according to an embodiment of the present disclosure.

As shown in FIGS. 1 and 2, the water dispensing apparatus 100 according to the embodiment of the present disclosure includes a main body 10 and an infrared sensing device 20.

In some embodiments of the present disclosure, the infrared sensing device 20 includes a mounting support 21 and an electric control board 22. The mounting support 21 is disposed on an inner side of the main body 10. The electric control board 22 is disposed on the mounting support 21, and has an infrared transmitting device 23 and an infrared receiving device 24 for receiving infrared rays transmitted by the infrared transmitting device 23.

The mounting support 21 has a first through hole 211 and a second through hole 212. The first through hole 211 is located at a position corresponding to the infrared transmitting device 23 to ensure that the infrared transmitting device 23 can transmit the infrared rays outwardly. The second through hole 212 is located at a position corresponding to the infrared receiving device 23 to ensure that reflected infrared rays can be received by the infrared receiving device 24 through the second through hole 212.

According to the water dispensing apparatus 100 of the embodiment of the present disclosure, by mounting the infrared sensing device 20 on the main body 10, a user can control a water dispensing of the water dispensing apparatus 100 by means of a simple gesture, which provides convenient control and can avoid a cross infection caused by the user's direct contact with the water dispensing apparatus 100, to ensuring water safety of the user and improving user experience.

As shown in FIGS. 2 to 6, according to some embodiments of the present disclosure, the infrared transmitting device 23 and the infrared receiving device 24 are spaced apart from each other and disposed on a same side of the electric control board 22. Further, one of the mounting support 21 and the electric control board 22 has a partition portion 213 located between the infrared transmitting device 23 and the infrared receiving device 24.

That is, the partition portion 213 may be disposed on a side of the mounting support 21 facing towards the electric control board 22, or may be disposed on a side of the electric control board 22 facing towards the mounting support 21, and after the mounting support 21 is assembled with the electric control board 22, the infrared transmitting device 23 is spaced apart from the infrared receiving device 24 by the partition portion 213.

Therefore, by arranging the partition portion 213 between the infrared transmitting device 213 and the infrared receiving device 214, it is possible to prevent the infrared rays in the infrared sensing device 20 from channeling, to avoiding the water dispensing apparatus 100 from being activated by mistake, and ensuring that the user can more accurately control the water dispensing of the water dispensing apparatus 100.

Figure 4:
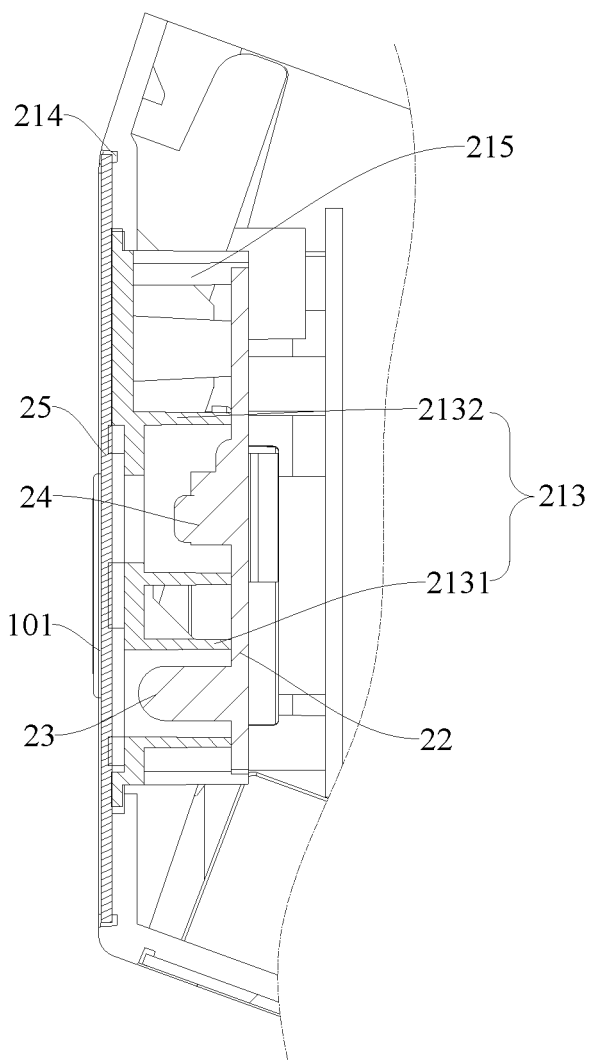
FIG. 4 is a partial structural enlarged view in FIG. 3.

As shown in FIG. 4, in some embodiments, the partition portion 213 includes a first partition ring 2131 located on the side of the mounting support 21 facing towards the electric control board 22 and in communication with the first through hole 211. The infrared transmitting device 23 is disposed in the first partition ring 213, and the infrared transmitting device 23 are partitioned from the infrared receiving device 24.

When the water dispensing apparatus 100 is in operation, the infrared transmitting device 23 in the first partition ring 2131 can transmit the infrared rays. A part of the infrared rays transmitted by the infrared transmitting device 23 passes through the first through hole 211 and a first avoidance hole 251 sequentially, while the other infrared rays are blocked by the first partition ring 2131 to avoid light channeling from being generated in the infrared sensing device 20.

As shown in FIG. 4, in some embodiments, the partition portion 213 includes a second partition ring 2132 located on the side of the mounting support 21 facing towards the electric control board 22 and in communication with the second through hole 212. The infrared receiving device 24 is disposed in the second partition ring 2132.

When there is an obstacle in front of the infrared sensing device 20, the infrared rays transmitted by the infrared transmitting device 23 will be reflected by the obstacle and received by the infrared receiving device 24. By providing the second partition ring 2132, it is possible to further prevent the light channeling of the infrared rays from occurring, and thus the infrared receiving device 24 can accurately receive signals.

Figure 5:
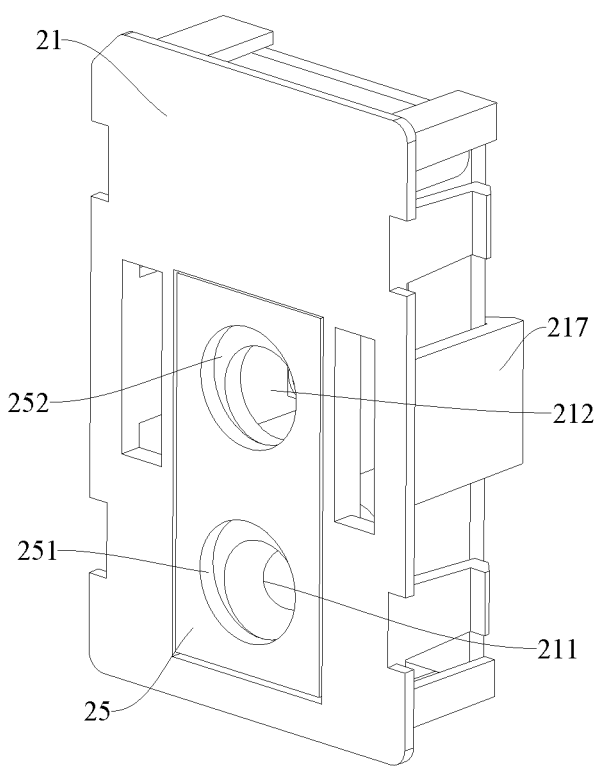
FIG. 5 is a schematic structural view of an infrared sensing device of a water dispensing apparatus according to an embodiment of the present disclosure from one view.

As shown in FIGS. 4 and 5, according to some embodiments of the present disclosure, a light-shielding member 25 is disposed between the main body 10 and the mounting support 21, and has the first avoidance hole 251 and a second avoidance hole 252. The avoidance hole 251 is located at a position corresponding to the first through hole 211, and the second avoidance hole 252 is located at a position corresponding to the second through hole 212.

In some embodiments, the first avoidance hole 251 has a size slightly greater than a size of the first through hole 211, and the second avoidance hole 252 has a size slightly greater than a size of the second through hole 212. Thus, it is possible to prevent transmission of the infrared rays from being affected by the light-shielding member 25.

Therefore, by arranging the light-shielding member 25 between the main body 10 and the mounting support 21, a sealing performance between the main body 10 and the mounting support 21 can be ensured to prevent the infrared rays from being exposed from a gap between the main body 10 and the mounting support 21, and to prevent infrared rays from an outside from entering the infrared sensing device 20 to cause interference, to ensuring the accuracy of signal transmission.

As shown in FIGS. 4 and 5, in some embodiments, the mounting support 21 has a mounting recess 214 on a side thereof facing towards the main body. The first through hole 211 and the second through hole 212 are disposed on a bottom wall of the mounting recess 214, and the light-shielding member 25 is disposed in the mounting recess 214.

Thus, by arranging the mounting recess 214 on the mounting support 21 and placing the light-shielding member 25 in the mounting recess 214, the light-shielding member 25 can be positioned and easily mounted.

The light-shielding member 25 is a light shielding cotton with a thickness greater than a depth of the mounting recess 214. Since the light shielding cotton has a predetermined elasticity, by setting its thickness greater than the depth of the mounting recess 214, when the infrared sensing device 20 is assembled with the main body 10, the light shielding cotton will be compressed and deformed, to ensuring that the light shielding cotton is brought into close contact with the bottom wall of the mounting recess 214 and the main body 10, i.e., ensuring that a sealing between the mounting support 21 and the main body 10, to effectively preventing the infrared rays transmitted by the infrared transmitting device 23 from escaping to the infrared receiving device 24 through the gap between the mounting support 21 and the main body 10.

Figure 6:
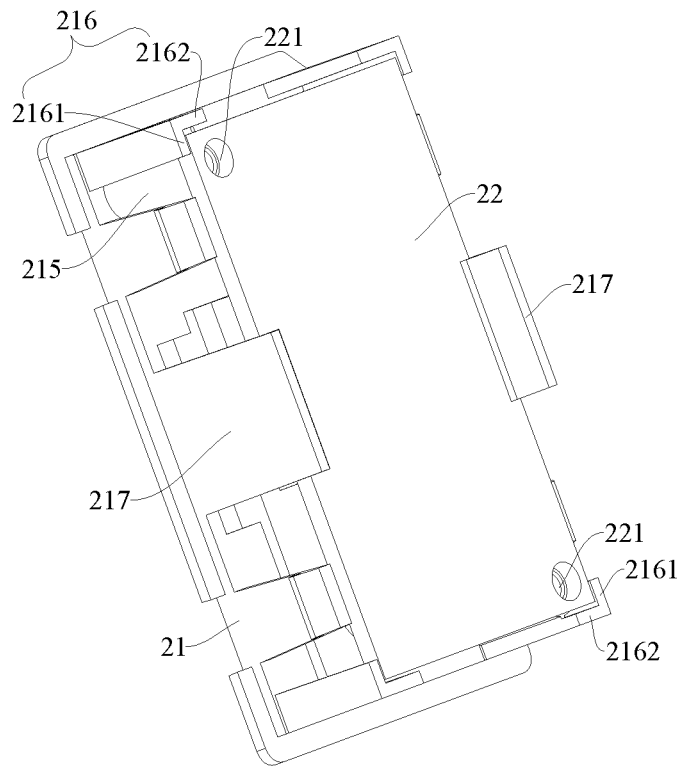
FIG. 6 is a structural schematic view of an infrared sensing device of a water dispensing apparatus according to an embodiment of the present disclosure from another view.

As shown in FIG. 5 and FIG. 6, according to some embodiments of the present disclosure, the mounting support 21 and the electric control board 22 are connected to each other through buckling and/or by means of a fastener, which is reliable in connection and convenient in assembly and disassembly.

For example, the fastener is disposed on both ends of the electric control board 22, respectively, and the electric control board 22 is connected to the mounting support 21 by at least two fasteners, and to connect the electric control board 22 to the mounting support 21 in a simple manner, and parts initially mounted on the electric control board 22 would not fall off during the mounting process.

According to some embodiments of the present disclosure, the mounting support 21 has at least one support portion 215 provided on a side thereof facing towards the electric control board 22, and the electric control board 22 is supported by the at least one support portion 215. The mounting support 21 has at least two buckling portions 217 opposite to each other. The at least two buckling portions 217 are buckled on and engaged with two opposite edges of the electric control board 22. In this way, the mounting support 21 and the electric control board 22 can be more closely connected together while easily disassembled.

In some embodiments, the at least one support portion 215 includes at least two support portions 215 connected to the electric control board 22 by the fasteners, respectively. The electric control board 22 may be formed as a rectangular plate, and has a same shape as the mounting support 21. One support portion 215 may be disposed on each of four corners of the mounting support 21, respectively. Further, for the four support portions 215, two diagonally arranged support portions 215 have connection holes defined thereon, and the electric control board 22 correspondingly has two diagonally arranged fixing holes 221, and the two fixing holes 221 is located at positions corresponding to the above two connection holes, and the electric control board 22 and the mounting support 21 are connected together by the two fasteners. Also, the four support portions 215 can also support and protect the electric control board 22.

In some embodiments, the at least one support portions 215 has a limiting rib 216 located on a side of the electric control board, and the electric control board 22 is limited in position by the limiting rib 216, and the electric control board 22 does not easily slide during the mounting, which is convenient for the electric control board 22 to be fixed on the mounting support 21.

In some specific embodiments, the electric control board 22 is formed as a rectangular plate. The limiting rib 216 includes a first rib section 2161 and a second rib section 2162 that are connected to each other. The first rib section 2161 is located on one side edge of the electric control board 22, and the second rib 2162 is located on another side edge of the electric control board 22. For example, the first rib section 2161 is configured to abut with a long edge of the electric control board 22, and the second rib 2162 is configured to abut with a short edge of the electric control board 22, and the limiting rib 216 is to limit two degrees of freedom of the electric control board 22, which further ensures that the electric control board 22 and the mounting support 21 are easily assembled.

It should be noted that a thickness of the limiting rib 216 should not be too large to prevent occupying too much space. Meanwhile, the electric control board 22 can be positioned by the limiting ribs 216 to ensure that the electric control board 22 does not easily slide, and the electric control board 22 can be tightly connected to the mounting support 21 during the mounting process.

According to some embodiments of the present disclosure, the main body 10 includes a light-transmitting panel 101, and the infrared sensing device 20 is arranged on an inner side of the light-transmitting panel 101. The light-transmitting panel 101 has a good transmittance for the infrared rays, and the infrared rays transmitted by the infrared transmitting device 23 can smooth transmit through t light-transmitting panel 101, and that the infrared receiving device 24 can receive the signals more accurately. In addition, the light-transmitting panel 101 covers outer surfaces of the infrared transmitting device 23 and the infrared receiving device 24, which not only provides a decorative effect, but also can isolate external water, gas, and dust, to provide protections.

As shown in FIGS. 1 to 6, in some specific examples, the water dispensing apparatus 100 includes a main body 10 and an infrared sensing device 20. The main body 10 includes an outlet portion 102. A support tray 103 for supporting a water holding member (such as a cup) is disposed below the outlet portion 102. A collecting tray 104 is disposed below the support tray 103 to collect the water dripped during the water dispensing process. The main body 10 has a control panel (i.e., a light-transmitting panel 101) provided on an upper part thereof and gradually inclined forwardly from top to bottom. The control panel is located above the outlet portion 102, which can prevent the user from bending over for the water dispensing, and thus is convenient for the user's control.

The infrared sensing device 20 includes a mounting support 21 and an electric control board 22. The mounting support 21 is arranged on an inner side of the main body 10. The electric control board 22 is arranged on the mounting support 21, and has an infrared transmitting device 23 and an infrared receiving device 24 provided on a side thereof and spaced apart from each other. The infrared receiving device 24 is configured to receive infrared rays transmitted by the infrared transmitting device 23.

The mounting support 21 has a first partition ring 2131 and a second partition ring 2132 that are arranged on a side thereof facing towards the electric control board 22. The infrared transmitting device 23 is disposed in the first partition ring 2131, and the infrared receiving device 24 is disposed in the second partition ring 2132. The mounting support 21 has a first through hole 211 and a second through hole 212. The first through hole 211 is in communication with the first partition ring 2131, and located at a position corresponding to the infrared transmitting device 23, where the first through hole 211 is so positioned that the infrared transmitting device 23 can transmit the infrared rays outwardly. The second through hole 212 is in communication with the second partition ring 2132, and located at a position corresponding to the infrared receiving device 24.

A light-shielding member 25 is disposed between the main body 10 and the mounting support 21, and has a first avoidance hole 251 and a second avoidance hole 252. The first avoidance hole 251 is located at a position corresponding to the first through hole 211, and the second avoidance hole 252 is located at a position corresponding to the second through hole 212.

A water dispensing apparatus 100 according to other embodiments of the present disclosure will be described below with reference to FIGS. 1 to 8.

As shown in FIG. 1 to FIG. 6, the water dispensing apparatus 100 according to the embodiment of the present disclosure includes a main body 10 and an infrared sensing device 20. The main body 10 includes an outlet portion 102, and a control valve for controlling a water dispensing through the outlet portion 102. The control valve to transmit signal with an infrared sensing device 20. In some embodiments, the control valve can receive a water dispensing control signal of from infrared sensing device 20 to control an opening or closing of the control valve based on the received water dispensing control signal, to controlling a water dispensing through the outlet portion 102.

A sensing region of the infrared sensing device 20 is located at a surrounding of the main body 10 and is adjacent to the main body 10. When the user approaches the main body 10 and enters the sensing region, the infrared rays transmitted by the infrared sensing device 20 will be reflected by a human body, and then received by the infrared sensing device 20 to be analyzed, to controlling the control valve to make a respond.

In the water dispensing apparatus 100 according to the embodiment of the present disclosure, by mounting the infrared sensing device 20 on the main body 10, the user thus does not need to directly contact the water dispensing apparatus 100, and control the opening or closing of the control valve through simple gestures to control the water dispensing, which is convenient to control, and avoids the cross infection caused by the user's direct contact with the water dispensing apparatus, to ensuring that the user's water safety and improving the user experience.

In order to detect users coming from the surrounding of the water dispensing apparatus 100, one or more infrared sensing devices 20 may be provided. For example, the infrared sensing devices 20 may be disposed on front, rear, left and right parts of the main body 10, respectively, and realize precise control of the water dispensing.

Since the outlet portion 102 is usually disposed at a front of the main body 10, the user usually takes water from the front of the water dispensing apparatus 100. Therefore, in some embodiments, at least one infrared sensing device 20 is located at the front of the main body 10, and thus at least one sensing region is located at the front of the main body 10.

According to some embodiments of the present disclosure, a predetermined distance from the sensing region to the main body 10 is between 1 cm and 15 cm. That is, the sensing region is a region from a position from the main body 10 by 1 cm to a position from the main body 10 by 15 cm. When the user enters this sensing region, the infrared sensing device 20 can detect the human body, i.e., collect the water dispensing control single, and control the control valve to be opened based on the collected water dispensing control single, and the water dispensing can be realized at the outlet portion 102.

In some embodiments, the predetermined distance is between 1 cm to 10 cm.

Figure 7:
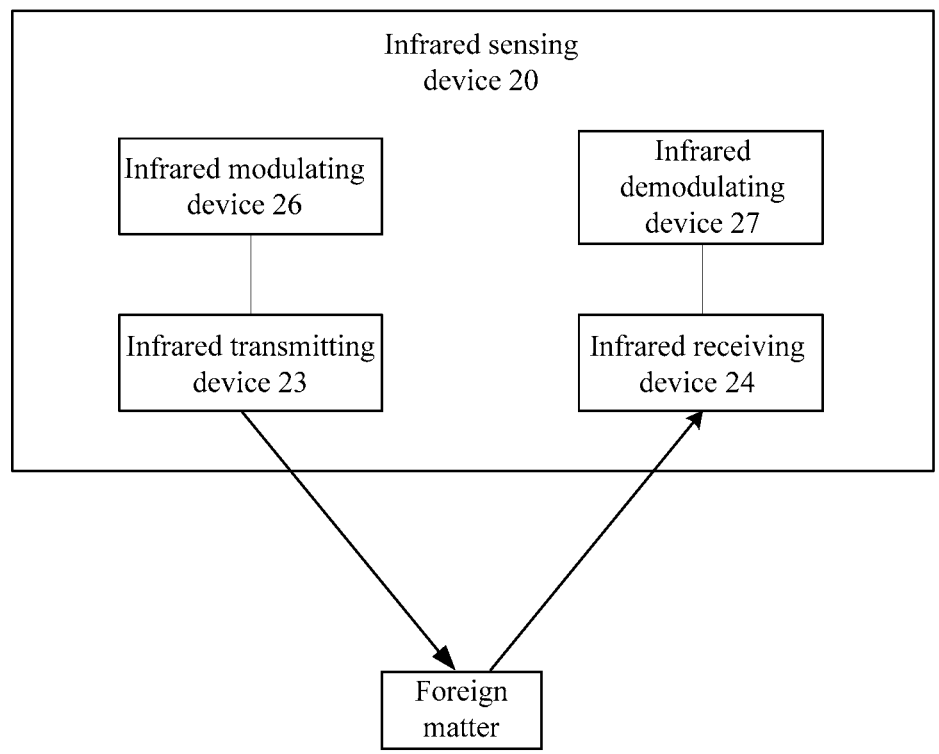
FIG. 7 is a structural block diagram of an infrared sensing device according to an embodiment of the present disclosure.

As shown in FIG. 7, according to some embodiments of the present disclosure, the infrared sensing device 20 includes an infrared modulating device 26, an infrared transmitting device 23, an infrared receiving device 24, and an infrared demodulating device 27.

In some embodiments, the infrared modulating device 26 is configured to modulate a predetermined frequency to obtain an infrared modulated signal. The infrared transmitting device 23 is configured to transmit the infrared modulated signal to detect a person approaching the main body 10. The infrared receiving device 24 is configured to receive the infrared modulated signal reflected by the person. The infrared demodulating device 27 is configured to demodulate the received infrared modulated signal based on the predetermined frequency.

That is, when the electrical signal is applied to an input terminal of the infrared transmitting device 23, the infrared transmitting device 23 can transmit the infrared rays, and the infrared receiving device 24 is turned on after receiving the infrared rays. In addition, when the electrical signal is removed from the input terminal of the infrared transmitting device 23, the infrared transmitting device 23 stops transmitting the infrared rays, and the infrared receiving device 24 is triggered to be turned off.

Figure 8:
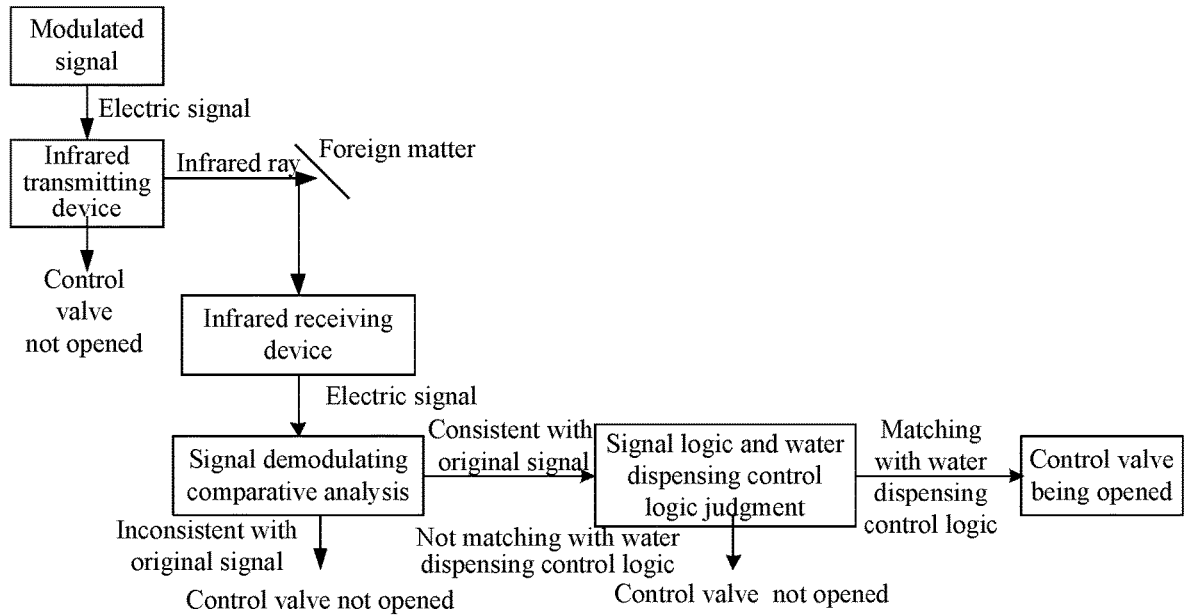
FIG. 8 is a control flow chart of an infrared sensing device according to an embodiment of the present disclosure.
Figure 9:
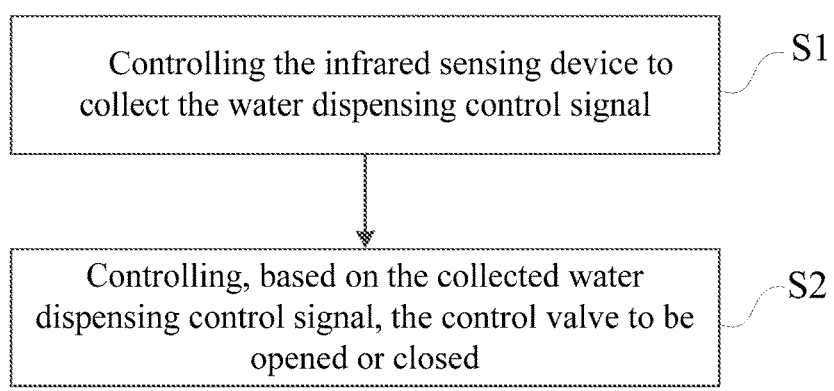
FIG. 9 is a control flow chart of a water dispensing apparatus according to an embodiment of the present disclosure.

In some embodiments, as shown in FIG. 8, when the front or top part of the water dispensing apparatus 100 is not blocked, the infrared rays are directly transmitted to an outside of the water dispensing apparatus 100, and the infrared receiving device 24 cannot receive any infrared rays. Thus, the control valve is not opened. In addition, when a human hand or other objects is in the sensing region, the infrared rays are received by the infrared receiving device 24 after reflected by the human hand or other objects, and then are demodulated by the infrared demodulating device 27 to separate a baseband signal from the modulated signal, and then the baseband signal is compared with an encoded signal. When the baseband signal is consistent with a transmitting code, then it is started to determine whether the baseband signal meets a water dispensing control logic. If the baseband signal meets the water dispensing control logic, the control valve is opened. If the baseband signal does not meet the water dispensing control logic, the control valve is controlled not to be opened. If the baseband signal is consistent with the transmitting code, the control valve is controlled not to be opened.

A control method of a water dispensing apparatus according to embodiments of the present disclosure includes the following steps.

At S1, an infrared sensing device is controlled to collect a water dispensing control signal; and At S2, based on the collected water dispensing control signal, a control valve is opened or closed.

In the control method of the water dispensing apparatus according to the embodiment of the present disclosure, a user does not need to directly contact the water dispensing apparatus, and can control the opening or closing of the control valve through simple gestures to control the water dispensing, which is convenient to control, and avoids the cross infection caused by the user's direct contact with the water dispensing apparatus, to ensuring the user's water safety and improving user experience.

According to some embodiments of the present disclosure, the water dispensing control signal is collected one or more times during a first predetermined period of time, and the control valve is opened to allow the water dispensing through an outlet portion.

For example, when the predetermined period of time is set as 1 second, if the water dispensing control signal is collected by the infrared sensing device once, the control valve will be opened to allow the water dispensing through the outlet portion. For example, when the predetermined period of time is set as 1 second, if the water dispensing control signal is consecutively collected by the infrared sensing device collects twice, the control valve will be opened to allow the water dispensing through the outlet portion. In some embodiments, it is also possible to control a hot water dispensing or a cold water dispensing through the outlet portion based on a number of the water dispensing control signals collected within the first predetermined period of time.

According to some embodiments of the present disclosure, if a duration of the collected water dispensing control signal exceeds a second predetermined period of time, the control valve is opened to allow the water dispensing through the outlet portion. For example, if the duration of the water dispensing control signal collected by the infrared sensing device exceeds 1 second, the control valve is opened to allow the water dispensing through the outlet portion. If the collected water dispensing control signal disappears, the control valve is closed.

According to some embodiments of the present disclosure, if the duration of the collected water dispensing control signal exceeds a third predetermined period of time, the control valve is closed. For example, if the duration of the collected water dispensing control signal exceeds 5 seconds, the control valve is closed to avoid mis-operation for the water dispensing.

It should be noted that the water dispensing control signal is a body movement of the person. For example, the water dispensing control signal may be a waving action of the human body, or a body swinging action of the human body, which may be specifically set as desired.

In the description of the present disclosure, it should be understood that the orientation or position relationship indicated by the terms "length," "width," "thickness," "cupper," "lower," "front," "rear," "left," "right," "vertical," "horizontal," "top," "bottom," "inner," "outer," "axial," "radial," "circumferential," etc. is based on the orientation or position relationship shown in the drawings, and is only for the convenience of describing the present disclosure and simplifying the description, rather than indicating or implying that the associated device or element must have a specific orientation, or be constructed and operated in a specific orientation, and therefore cannot be understood as a limitation of the present disclosure.

Other constitutions and operations of the water dispensing apparatus according to the embodiments of the present disclosure, and will not be described in detail here.

In the description of the specification, descriptions with reference to the terms "an embodiment," "some embodiments," "illustrative embodiments," "an example," "a specific example," or "some examples," mean that a particular feature, structure, material, or characteristic described in connection with the embodiment or example are included in at least one embodiment or example of the present disclosure. The schematic representations of the above terms throughout this specification are not necessarily referring to the same embodiment or example of the present disclosure. Furthermore, the described particular features, structures, materials, or characteristics may be combined in any suitable manner in one or more embodiments or examples.

What is claimed is:

1. A water dispensing apparatus, comprising:
   a main body; and
   an infrared sensing device, comprising:
      a mounting support disposed on an inner side of the main body; and
      an electric control board disposed on the mounting support, the electric control board comprising an infrared transmitting device, and an infrared receiving device configured to receive an infrared ray transmitted by the infrared transmitting device;
   wherein the mounting support has a first through hole at a position corresponding to the infrared transmitting device, and a second through hole at a position corresponding to the infrared receiving device;
   wherein a light-shielding member is disposed between the main body and the mounting support;
   wherein the light-shielding member has a first avoidance hole at a position corresponding to the first through hole, and a second avoidance hole at a position corresponding to the second through hole.

2. The water dispensing apparatus according to claim 1, wherein:
   the infrared transmitting device and the infrared receiving device are spaced apart from each other and disposed on a same side of the electric control board;
   a first of the mounting support and the electric control board has a partition portion located between the infrared transmitting device and the infrared receiving device.

3. The water dispensing apparatus according to claim 2, wherein the partition portion comprises a first partition ring located on a side of the mounting support facing towards the electric control board and in communication with the first through hole, the infrared transmitting device being disposed in the first partition ring.

4. The water dispensing apparatus according to claim 2, wherein the partition portion comprises a second partition ring located on a side of the mounting support facing towards the electric control board and in communication with the second through hole, the infrared receiving device being disposed in the second partition ring.

5. The water dispensing apparatus according to claim 1, wherein:
   the mounting support has a mounting recess defined on a side thereof facing towards the main body;
   the first through hole and the second through hole are formed on a bottom wall of the mounting recess; and
   the light-shielding member is disposed in the mounting recess.

6. The water dispensing apparatus according to claim 5, wherein the light-shielding member is a light-shielding cotton having a thickness greater than a depth of the mounting recess.

7. The water dispensing apparatus according to claim 1, wherein the mounting support and the electric control board are connected to each other through buckling and/or by a fastener.

8. The water dispensing apparatus according to claim 1, wherein:
   the mounting support has a support portion provided on a side thereof facing towards the electric control board;
   the electric control board is supported by the support portion;
   the mounting support has at least two buckling portions opposite to each other, the at least two buckling portions being buckled on and engaged with two opposite edges of the electric control board.

9. The water dispensing apparatus according to claim 8, wherein at least one support portion has a limiting rib located on a side of the electric control board.

10. The water dispensing apparatus according to claim 9, wherein:
    the electric control board is a rectangular plate; and
    the limiting rib comprises a first rib section and a second rib section that are connected to each other, the first rib section being located on a first side edge of the electric control board, the second rib section being located on a second side edge of the electric control board.

11. The water dispensing apparatus according to claim 1, wherein the main body comprises a light-transmitting panel, the infrared sensing device being disposed on an inner side of the light-transmitting panel.

12. A water dispensing apparatus, comprising:
    a main body comprising an outlet portion and a control valve configured to control a water dispensing through the outlet portion; and
    an infrared sensing device configured to transmit signal with the control valve;
    wherein the control valve is configured to receive a water dispensing control signal from the infrared sensing device to control an opening or closing of the control valve; and the infrared sensing device has sensing regions located at a surrounding of the main body and is adjacent to the main body;

wherein the infrared sensing device comprises:

an infrared modulating device configured to modulate a predetermined frequency to obtain an infrared modulated signal;

an infrared transmitting device configured to transmit the infrared modulated signal to detect a person approaching the main body;

an infrared receiving device configured to receive the infrared modulated signal reflected by the person; and an infrared demodulating device configured to demodulate the received infrared modulated signal based on the predetermined frequency.

13. The water dispensing apparatus according to claim 12, wherein one or more infrared sensing devices are provided.

14. A control method of the water dispensing apparatus according to claim 12, the control method comprising:

controlling the infrared sensing device to collect the water dispensing control signal; and controlling, based on the collected water dispensing control signal, the control valve to be opened or closed.

15. The control method of the water dispensing apparatus according to claim 14, wherein the control valve, in response to the water dispensing control signal being collected one or more times within a first predetermined period of time, is opened to allow the water dispensing through the outlet portion.

16. The control method of the water dispensing apparatus according to claim 14, wherein the control valve, in response to a duration of the collected water dispensing control signal exceeding a second predetermined period of time, is opened to allow the water dispensing through the outlet portion.

17. The control method of the water dispensing apparatus according to claim 16, wherein the control valve, in response to a disappearance of the collected water dispensing control signal, is closed.

18. The control method of the water dispensing apparatus according to claim 14, wherein the control valve, in response to a duration of the collected water dispensing control signal exceeding a third predetermined period of time, is closed.

* * * * *